United States Patent
Lui et al.

(10) Patent No.: US 11,966,399 B1
(45) Date of Patent: Apr. 23, 2024

(54) PROCESSING TOP-K QUERIES ON DATA IN RELATIONAL DATABASE SYSTEMS

(71) Applicant: Oracle International Corporation, Redwood Shores, CA (US)

(72) Inventors: Dennis Lui, San Jose, CA (US); Allison L Holloway, San Carlos, CA (US); Shasank Kisan Chavan, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 4 days.

(21) Appl. No.: 17/966,749

(22) Filed: Oct. 14, 2022

(51) Int. Cl.
G06F 16/2455 (2019.01)
G06F 16/23 (2019.01)
G06F 16/2453 (2019.01)

(52) U.S. Cl.
CPC ........ G06F 16/24554 (2019.01); G06F 16/23 (2019.01); G06F 16/24537 (2019.01); G06F 16/24542 (2019.01)

(58) Field of Classification Search
None
See application file for complete search history.

(56) References Cited

U.S. PATENT DOCUMENTS

| | | | | |
|---|---|---|---|---|
| 2017/0293658 A1* | 10/2017 | Zhang | ............... | G06F 16/24554 |
| 2018/0349439 A1* | 12/2018 | Zhang | ............... | G06F 16/24542 |
| 2019/0197174 A1* | 6/2019 | Kim | ..................... | G06F 16/258 |
| 2020/0125666 A1* | 4/2020 | Eadon | ............... | G06F 16/24557 |
| 2022/0309063 A1* | 9/2022 | Du | ..................... | G06F 16/24537 |

* cited by examiner

*Primary Examiner* — Christopher J Raab
(74) *Attorney, Agent, or Firm* — Hickman Becker Bingham Ledesma LLP

(57) ABSTRACT

Techniques for processing top-K queries are provided. In one technique, a database statement is received that requests top-K results related to a database object and that indicates two columns thereof: a first column by which to partition a result set and a second column by which to order the result set. A buffer is generated. For each of multiple rows in the database object: a first key value that associated with a first value in the first column of said each row is identified; a second key value that associated with a second value in the second column of said each entry is identified; a slot in the buffer is identified based on the first key value and the second key value; and the slot in the buffer may be updated based on the second key value. A response to the database statement is generated based on the buffer.

20 Claims, 5 Drawing Sheets

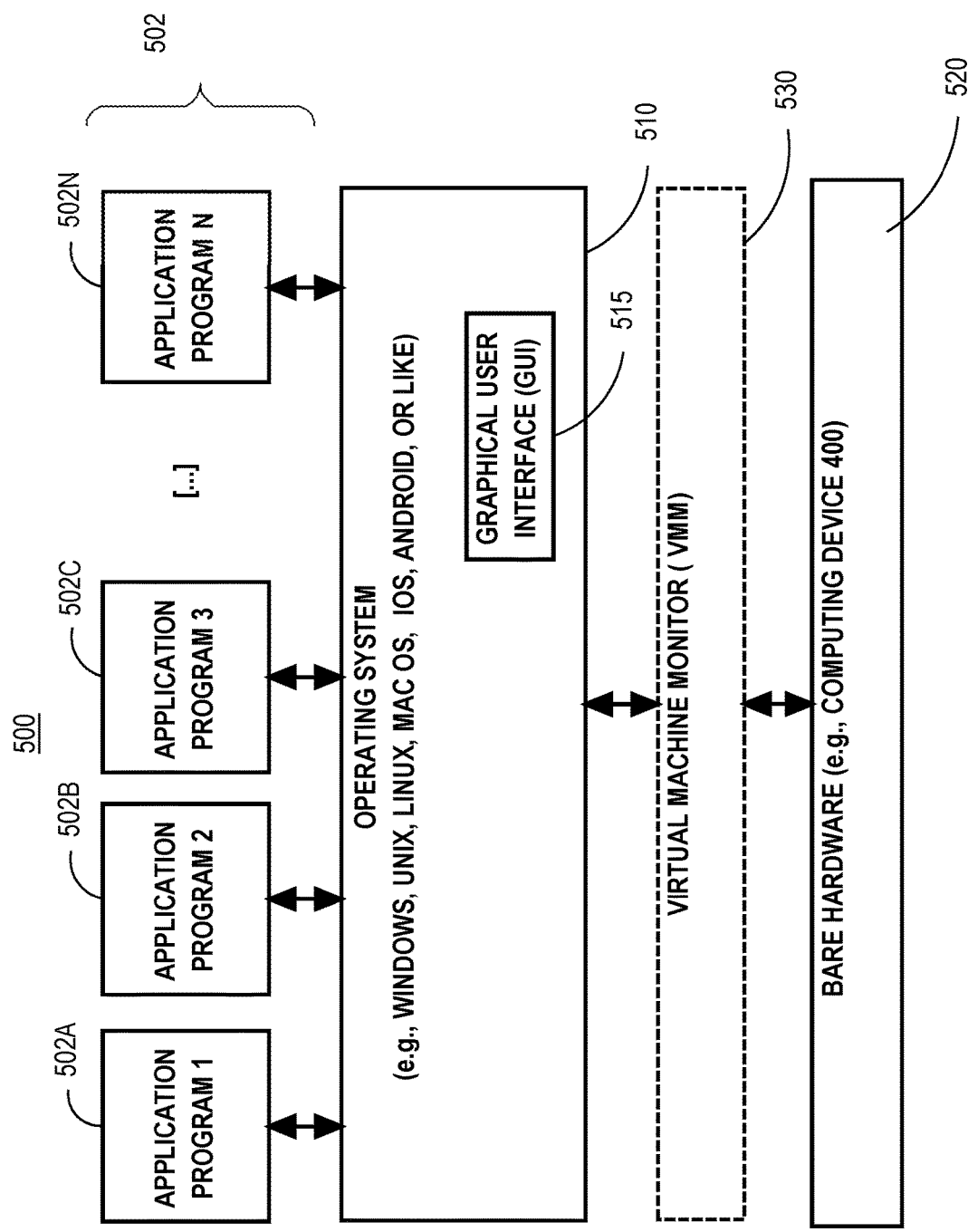

PROCESSING TOP-K QUERIES ON DATA IN RELATIONAL DATABASE SYSTEMS

TECHNICAL FIELD

The present disclosure relates generally to relational database systems and, more particularly to, processing Top-K queries in an efficient manner.

BACKGROUND

Query processing is a fundamental part of a database management system. As the amount of data stored in relational databases is increasing and top-K queries are becoming more popular, it is necessary to support top-k query processing. The main objective of processing a top-k query is to return the k highest ranked results quickly and efficiently.

A top-K query is defined as follows: given a database D of objects (each of which is characterized by one or more attributes), a scoring function f (according to which we rank the objects in D), and the number of expected results K, a top-K query returns the K objects with the highest rank in f.

A simple top-K query such as "SELECT salary FROM employees ORDER BY salary FETCH FIRST 5 ROWS ONLY" requires buffering all the rows in the table, performing a sort operation on all the values for the salary column in the employees table, and then returning only the top 5 values.

A variation of the previous query is one that employs a PARTITION BY and the ROW_NUMBER( ) analytic function as follows:
SELECT*FROM
  (SELECT department, salary,
    ROW_NUMBER( ) OVER (PARTITION BY department ORDER BY salary) AS rn
    FROM employees)
  WHERE rn<=5;

This top-K query requires decompressing (if compressed) and fetching all the rows from the employee table, using the department column value as input to a hash table that returns a sorted list of the encountered salary column values, and inserting the row's salary column value into that list. After all rows have been processed, the top five salary column values within each list would be returned with the corresponding department column value.

This type of query can also have a group-by with aggregation:
SELECT*FROM
  (SELECT store_id, purchase_date, SUM(purchase_amount)
    ROW_NUMBER( ) OVER (PARTITION BY store_id ORDER BY purchase_date) AS rn
    FROM purchases GROUP BY store_id, purchase_date)
  WHERE rn<=5;

This query would require similar processing, but with an additional step for performing the group-by aggregation. After decompressing and fetching all the rows from the purchases table, the group-by aggregation could be computed by constructing a hash table whose inputs are (store_id, purchase_date) tuples, and the output being the currently accumulated value for sum(purchase_amount). After performing the grouping and aggregation, the evaluation proceeds by using another hash table whose input is the store_id column values and output a list of (purchase_date, aggregated sum) tuples sorted by purchase_date. The purchase_date column value and aggregated sum value are then inserted into the list. After all rows are processed the first five (purchase_date, aggregated sum) tuples in the list for each store_id is then returned.

Though the above approaches ensure correct results, the costs in processing time and computer resources to execute these approaches can be considerable, particularly for large tables. For example, the costs of mapping each partition to its respective lists of order-by values and the amount of work required to perform the group-by aggregation are significant.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 5 is a block diagram of a basic software system that may be employed for controlling the operation of the example computer system.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for processing top-K queries on data in relational database systems. In one technique, a database statement that requests top K results related to a database object is received, such as a table. The database statement indicates (1) a first column by which to partition a result set and (2) a second column by which to order the result set. A buffer is generated that includes multiple ordered entries. For each row of multiple rows in the database object, a first key associated with a first value in the first column of the row is identified, a second key associated with a second value in the second column of the row is identified, a slot in the buffer is identified based on the first key and the second key, and the ordered entry is updated based on the second value.

Embodiments improve computer-related technology related to query processing in database systems. Embodiments improve query performance of top-K queries by reducing: (1) the costs of mapping each partition to their lists of encountered order-by values by using integer keys instead of a hash table; (2) the maintenance cost of each sorted list of encountered order-by values by using integer keys to represent values and leveraging integer comparisons rather than decompressed column values and value comparisons; (3) general per-row work since most processing is done during fetching of the column values, and so less data needs to be transmitted up through the normal query evaluation framework; and (4) the amount of work required to perform the group-by aggregation when the group-by is to be done on exactly the partition-by and sort-by columns.

Example System

Figure 1:
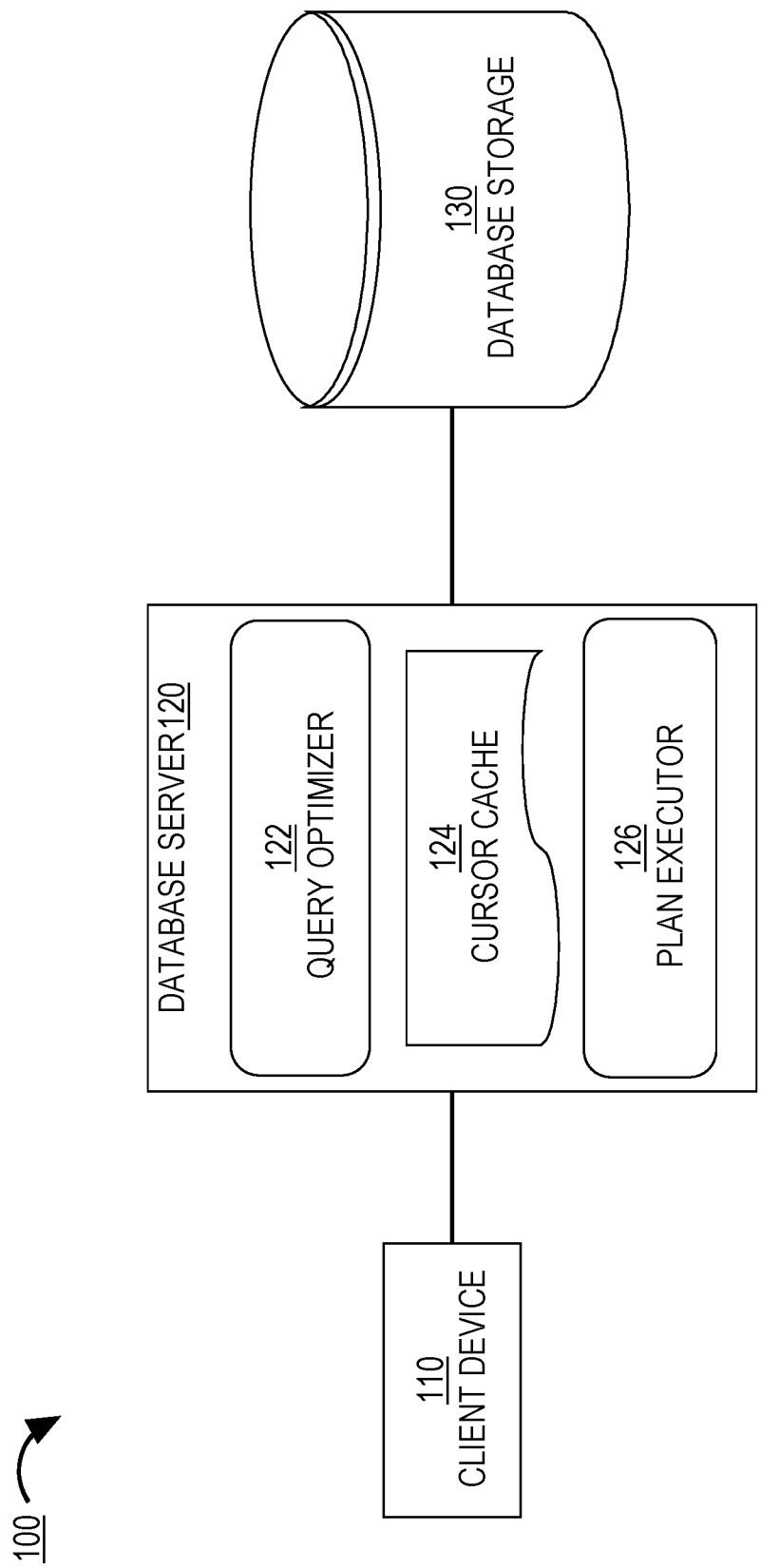
FIG. 1 is a block diagram that depicts an example system for processing database statements, including top-K queries, in an embodiment.

FIG. 1 is a block diagram that depicts an example system 100 for processing database statements, including top-K queries, in an embodiment. System 100 includes a client device 110 and a database system, which comprises a database server 120 and a database 130.

Client device 110 is communicatively coupled to database server 120, either via a local network, a wide area network (WAN), or the Internet. Although only a single client device is depicted, system 100 may include many client devices that are communicatively coupled to database server 120. Client device 110 hosts a database client that generates and submits client requests to database server 120. Client requests includes requests to read data stored in database 130 and requests to update data stored in database 130, such as deleting, inserting, and updating (i.e., replacing an existing value with a new value), which may be treated as a deletion followed by an insertion. Client device 110 receives, from database server 120, responses to the client requests. Data from responses may be presented on a screen of client device 110 and/or may be stored on client device 110 and/or another storage device that is accessible to client device 110.

Database server 120 comprises a query optimizer 122, a cursor cache 124, and a plan executor 126. Query optimizer 122, and plan executor 128 may be implemented in hardware, software, or any combination of hardware and software. While query optimizer 122 and plan executor 126 are depicted as separate components of database server 120, the functions described for all may be performed by a single component or may be performed by more or less components. Thus, the distribution of functions that each component performs may be implemented differently than what is described herein.

Cursor cache 124 is part of volatile memory and includes zero or more cursors, each containing an execution plan that was generated for a database statement. Two or more cursors in cursor cache 124 may include different execution plans for the same (or equivalent) database statement. A cursor may be automatically removed from cursor cache 124 for one or more reasons. For example, a cursor may be removed when there is a memory pressure or the cursor cannot be used anymore. When there is a memory pressure, one or more least recently used cursors can be aged out. When there is modification (such as dropping a table) to an object in a database statement, the corresponding cursor cannot be used anymore and can be invalidated or removed.

Query optimizer 122 receives a database statement (which may be issued by client device 110) and processes the database statement, resulting in the generation of one or more candidate execution plans and computes the cost of each candidate execution plan. An execution plan includes the access path for tables involved in the corresponding statement, a join method between tables, an order in which the joins should be performed, etc. Then query optimizer 122 selects the candidate execution plan with the lowest cost. The cost may be computed based on an estimation of an amount of data to be processed, a number of disk accesses, a number of CPU cycles, etc. Typically the lowest cost execution plan performs best (in terms of fewer resources and/or less time), but not always since the cost is an estimate.

In an embodiment, prior to generating one or more execution plans, query optimizer 122 determines whether there exists, in cursor cache 124, an execution plan that may be used for the database statement. The execution plan may have been generated for the exact database statement issued in the past. If the exact database statement was not issued in the past, the execution plan may still be used for the current database statement. For example, the current database statement may have the same joins and predicates as a previous one, but also has one or more constants that are different from one or more constants in the previous database statement. If such an execution plan exists in cursor cache 124, query optimizer 122 may determine to select that execution plan for execution instead of generating one or more candidate execution plans.

Such a determination may depend on the satisfying of one or more compilation criteria, which dictates whether to compile the database statement (i.e., perform a hard parse) or to select an appropriate execution plan. Examples of compilation criteria include whether one or more data sets that the database statement targets have changed in size by a certain percentage (e.g., +/−20%), whether a new version of query optimizer 122 or plan executor 126 is being executed/run relative to the version that generated or processed an existing/available execution plan, or whether a security policy is different. If one or more compilation criteria are satisfied, then query optimizer 122 generates a cost of different candidate execution plans even though one may be available in cursor cache 124.

Plan executor 126 executes a selected execution plan. Plan executor 126 tracks one or more statistics while executing the execution plan (i.e., in the same user database session as execution of the plan), such as a start timestamp indicating a time (e.g., clock time or system time) when plan executor 126 began executing the plan, an end timestamp indicating a time when plan executor 126 completed executing the plan, a total amount of CPU for executing the plan, a total number of logical I/O requests, a number of physical I/O requests, a size of data read from non-volatile storage into volatile storage, and a number of network I/O requests.

Database storage 130 is persistent storage device and stores one or more data sets. Examples of data sets include tables, table columns, arrays of values, and linked lists. Database storage 130 persistently stores metadata about these database objects, as well as statements, plans, and performance metrics.

Dictionaries

In an embodiment, a data set (such as values in a column of a table) has a dictionary associated with that data set. A dictionary maps a value in the data set to a dictionary value, such as an integer value. The dictionary value may be smaller in bytes than the data set value and may be of a different data type. For example, a column may be for the name of a month, such as 'January', 'February', or 'March', each of which may be a character string or character array. In place of a traditional month column that stores the character strings, a dictionary that maps a month value to an integer value is stored in its place. For example, 'January' is mapped to 0, 'February' is mapped to 1, and so forth. The mapping may be stored in a separate data structure.

A database object (such as a table) may include a column for containing dictionary values. For example, an employee table contains a column for department name but the column stores dictionary values, each corresponding to a department name. The employee table may also contain a column for salary, but the column stores integer keys, each corresponding to a salary. Alternatively, the dictionary is stored only in memory and, thus, might only be created upon reading in of the corresponding column into memory.

If a database object does not include a dictionary for a column when a top-K query is received, then database system 130 may construct a dictionary in response to receiving the top-K query (or "on-the-fly"). If the dictionary is constructed on-the-fly, then database system 130 may first determine whether the column that is missing a dictionary is a partition-by column in the top-K query or an order-by column in the top-K query. If the column is the partition-by column, then the order in which an integer key is assigned to a column value is not important. For example, if the column is department and the column is a partition-by column, then the first department value in the column may be assigned (or mapped to) 0, the second department value (if different than the first department value) may be assigned to 1, the second department value (if different than the previous department values) may be assigned to 2, etc.

On the other hand, if the column is an order-by column, then the order in which each column value is mapped to a dictionary value is important. For example, unique column values are first sorted (either ascending or descending) and then each unique column value is assigned a dictionary value, beginning with 0 and incrementing by one thereafter.

Example Top-K Query

The following is an example top-K database statement, or query:
SELECT*FROM
(SELECT department, salary,
ROW_NUMBER( ) OVER (PARTITION BY department ORDER BY salary) AS rn
FROM employees)
WHERE rn<=5;
This query requests the top five salaries in each department. This query is formatted according to the Structured Query Language (SQL). However, embodiments are not limited to SQL. The employee table is considered the "base database object" or "base table," from which the partition-by and order-by columns originate and from which pairs of dictionary key values are read. It is possible that the base table may be (a) a result of a join table operation (that takes two tables as input) or (b) a materialized view. The employee table includes at least the columns 'department' and 'salary.' The department column is identified as the "partition-by" column because the department name is included in the PARTITION BY clause. Similarly, the salary column is identified as the "order-by" column because the salary name is included in the ORDER BY clause. For query languages other than SQL, the partition-by column and the order-by column may be indicated in a top-K query in different ways. For example, in another query language, the name of a partition-by column may be succeeded by (instead of preceded by) a "Partition" indicator.

The following table (Table A) is a logical representation of an association between two columns of a base table (employee table) and their respective dictionaries. The employee table may include other columns not depicted here, such as a column for first name, a column for last name, a column for hire date, a column for supervisor name, a column for division number, and a column for mailing address. While Table A only has seven rows, a real-world employee table may comprise hundreds or thousands of rows, one for each employee.

TABLE A

| Department | Key Value for Department | Salary | Key Value for Salary | RowID |
|---|---|---|---|---|
| Engineering | 1 | 44 | 0 | R1 |
| HR | 0 | 52 | 2 | R2 |
| Management | 3 | 65 | 3 | R3 |
| Sales | 2 | 52 | 2 | R4 |
| Sales | 2 | 65 | 3 | R5 |
| Management | 3 | 48 | 1 | R6 |
| HR | 0 | 48 | 1 | R7 |

Temporary Buffer

As described previously, one approach for processing a top-K query is to leverage a hash table where each partition column value is input to a hash function and the result therefrom was used to lookup an entry in a hash table. Hashing is a computationally expensive operation.

In contrast, in embodiments, a temporary buffer is used to avoid the hash table approach. The temporary buffer may be one of many types of in-memory objects, such as a vector, an array, a two-dimensional array, or an array with a linked list for each entry in the array. Similarly, the temporary buffer may be divided (or sectioned) into a number of sections that is equal in number to the number of distinct values in the partition-by column. Each entry in an array or vector may be viewed as a "section."

In the scenario where the temporary buffer is implemented as an array, the temporary buffer may have the size of the product of (1) the cardinality of the partition-by column (or the number of distinct values in the partition-by column) and (2) the value of K in the top-K query. Thus, if there are four distinct values in the partition-by column and K equals five, then the size of the temporary buffer is twenty.

For example, given the above example top-K query where K equals five, if there are four unique departments (i.e., in the partition-by column), then a temporary buffer is generated that has the size of 20 (i.e., 4*5). Then, while reading the employee table, which comprises the department column (i.e., the partition-by column) and the salary column (i.e., the order-by column), a pair of dictionary key values is identified, one dictionary key value for the department column and one dictionary key value for the salary column. This pair of dictionary key values is used to locate a slot in the temporary buffer in which to update (or insert, if appropriate) the dictionary key value for the salary column (i.e., the order-by column). In some cases, no update is performed and the dictionary key value for the order-by column is ignored.

The dictionary key value (or simply "key value") for the partition-by column is used to identify an entry (or range of slots) in the temporary buffer. For example, the key values of a dictionary for the partition-by column may begin at 0. Thus, the key value is used as an index into the temporary buffer. For example, if the temporary buffer is a 2-dimensional array, a key value of 0 indexes into the first entry of the temporary buffer (where the first entry is associated with its own array), a key value of 1 indexes into the second entry of the temporary buffer (where the second entry likewise is associated with its own array), and so forth. As another example, where the temporary buffer is a 1-dimensional array, a key value of 0 indexes into the first entry of the temporary buffer (0*K=0), a key value of 1 indexes into the $(1*K)+1^{th}$ entry of the temporary buffer, a key value of 2 indexes into the $(2*K)+1^{th}$ entry of the temporary buffer, and so forth.

For each entry in the temporary buffer, there will be K slots in the temporary buffer that are associated with that entry, where K is the value in the top-K query. (To help distinguish between (1) entries, of the temporary buffer, that are indexed into using the key value of a partition-by column and (2) entries, of the temporary buffer, that are searched based on the key value of the order-by column, the latter entries are referred to as "slots.") For example, in a 1-dimensional array, the first K slots are for storing key values (of the order-by column) that are associated with (in the base table, or the employee table in this example) the first key value in a dictionary of key values for the partition-by column, the second K slots are for storing key values (of the order-by column) that associated with (in the base table) the second key value in the dictionary of key values for the partition-by column, and so forth.

Once an entry in the temporary buffer is identified based on the key value associated with the partition-by column (referred to as the "identified entry"), there are at least two techniques to locate a slot (in the temporary buffer) in which to insert the key value associated with the order-by column (or "order-by key value"), if appropriate.

In a first technique to locate a slot, the K slots associated the identified entry are scanned until an available or empty slot is found. If no empty slot is found, then the slot with the lowest order-by key value in the K slots is identified. (If the dictionary of order-by key values is ordered inversely with the values in the order-by column, then the slot with the highest value in the K slots is determined. For example, an order-by column comprises ratings where the lower the rating the better.) If the to-be-inserted order-by key value is greater than the lowest order-by key value in the K slots (or is less than the highest value in the case of inverse order), then the to-be-inserted order-by key value replaces the lowest/highest value in the identified slot. If the to-be-inserted order-by key value is not greater than the lowest order-by key value in the K slots (or is not less than the highest value in the case of inverse order), then the to-be-inserted order-by key value is ignored and the next pair of key values from the base database object (the employee table in this example) is retrieved, if there is a pair of key values that has not yet been considered.

In a second technique to locate a slot, each insertion of an order-by key value into one of the K slots is performed such that the key values in the K slots maintain their order (whether descending or ascending). If K is relatively large, then a binary search may be performed to find an available slot. A binary search avoids a linear search. An insertion of an order-by key value into one of K slots may cause a number of already-inserted key values to shift in order to maintain order of all the already-inserted key values. For example, if a key value is 4 and K is 5 and the K slots already contain key values 9, 5, 3, 3, and 1, then key values 3 and 3 may be shifted to the right (and key value 1 removed altogether from the K slots) in order to insert key value 4. Alternatively, the slots may be implemented such that no such shifting is required, such as using a linked list for the K slots.

The following table (Table B) depicts an example temporary buffer with values from Table A inserted therein using the first insertion technique (where the second row is the temporary buffer and the first row is an index, into the temporary buffer, that is the product of the partition-by key value and K, which is five in this example):

TABLE B

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|----|----|----|----|----|----|----|----|----|----|
| 2 | 1 |   |   |   | 0 |   |   |   |   | 2  | 3  |    |    |    | 3  | 1  |    |    |    |

In an embodiment, a top-K query indicates multiple partition-by columns. In this embodiment, an index into the temporary buffer may be generated by combining the key values of the partition-by columns for a row into a single key. This can be done in different ways. One such way is computing $\Sigma_{i=1}^{n} p_i * c_{i-1}$ where $p_i$ is the key value for $i^{th}$ partition-by column for the row, $c_i$ is the cardinality of the $i^{th}$ partition-by column, and n the number of partition by columns. Multiple order-by columns can be accommodated in the same way, as long as the method for combining key values maintains ordering.

Adjacent Buffer

In an embodiment, a second temporary buffer is generated to store entry identifiers that identify entries, in the base database object, from which the partition-by and order-by columns originate. For example, the first temporary buffer and the second temporary buffer are identical. If the first temporary buffer is an array of size M (e.g., number of unique partition key values*K), then the second temporary buffer is also an array of size M. When inserting an order-by key value into a slot in the first temporary buffer, a row identifier of the row (in the base database object) from which the order-by key value originated is inserted into a corresponding slot in the second temporary buffer. A row identifier identifies a row in a base table, such as the employee table in the above example.

The following table (Table C) depicts, along with the temporary buffer from Table B, an example adjacent buffer that includes the corresponding row identifiers from the employee table in Table A:

TABLE C

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|----|----|----|----|----|----|----|----|----|----|
| 2 | 1 |   |   |   | 0 |   |   |   |   | 2  | 3  |    |    |    | 3  | 1  |    |    |    |
| R2| R7|   |   |   | R1|   |   |   |   | R4 | R5 |    |    |    | R3 | R6 |    |    |    |

Data to Return

In an embodiment, the temporary buffer (that stores the order-by key values) is returned to an entity or component that requested the top-K results. The requesting entity/component may be a software entity (e.g., a program) or a hardware entity, such as a computing device/node. For example, a database server node (the requesting entity) receives a top-K query from a database client (the "originating entity") forwards the top-K query to a storage node (that is communicatively coupled to the database server node). The storage node performs the analysis (including generating and populating the temporary buffer with order-by key values) and then returns the temporary buffer to the database server node (the requesting entity), which transmits results of the top-K query to the database client (the originating entity).

Additionally, the dictionary of order-by key values may be returned to the requesting entity. In this way, the requesting entity can translate the order-by key values into their corresponding order-by column values.

In an embodiment where an adjacent (or second) buffer is generated, the adjacent buffer is also returned to the requesting entity. The requesting entity may use the adjacent buffer to retrieve the actual order-by column values and return such values to the originating entity (e.g., a database client), such as a database client. In this way, the dictionary of order-by key values (which may be large in size) does not need to be returned with the (first) temporary buffer.

In another embodiment, before data is returned to a requesting entity, the order-by key values in the temporary buffer are translated (e.g., using the dictionary of order-by key values or using the entity identifiers in the adjacent buffer) into their corresponding column values and the corresponding columns values are returned, not the order-by key values.

In an embodiment, if a set of order-by key values corresponding to a partition-by key value is not sorted, then the set of order-by key values is sorted before data is returned (either in descending order or ascending order) to the requesting entity. Alternatively, the requesting entity may sort the order-by key values when the requesting entity receives the temporary buffer and prior to returning the results to the originating entity.

Top-K Query with an Aggregation Function

The following is an example top-K query with an aggregation function:
SELECT*FROM
  (SELECT store_id, purchase_date, SUM(purchase_amount)
    ROW_NUMBER( ) OVER (PARTITION BY store_id ORDER BY purchase_date) AS rn
  FROM purchases GROUP BY store_id, purchase_date)
WHERE rn<=5;

This query requests the most recent purchase dates for each store along with a total amount that was purchased on each of those purchase dates. Again, this query is formatted according to SQL, though embodiments are not limited to SQL. The purchases table is considered the "base database object" or "base table," from which the partition-by and order-by columns originate and from which pairs of dictionary key values are read. The purchases table includes at least the columns 'store_id' and 'purchase_date.' The store_id column is identified as the "partition-by" column because the store_id name is included in the PARTITION BY clause. Similarly, the purchase_date column is identified as the "order-by" column because the purchase_date name is included in the ORDER BY clause. For query languages other than SQL, the partition-by column and the order-by column may be indicated in a top-K query in different ways.

This query also includes a GROUP BY clause that indicates the partition-by column and the order-by column. In an embodiment, such a top-K query is processed using embodiments herein that leverage a non-hash table approach if the GROUP BY clause indicates both the partition-by column and the order-by column. Otherwise, a hash table approach is used to process the top-K query. Therefore, a determination that the GROUP BY clause indicates both the partition-by column and the order-by column is a pre-requisite to using embodiments described herein. If the GROUP BY clause does not indicate the partition-by column and the order-by column, then a temporary buffer can still be used to store the order-by key values and a hash table can still be used to hold aggregated data.

This top-K query includes an aggregation function, i.e., a summation function. Other examples of aggregation functions that a top-k query might specify (or indicate) include a minimum function, a maximum function, an average (or mean) function, a median function, and a percentile function. The entries in the aggregation buffer can be formatted to accommodate whatever data type or work space is needed for the aggregate (e.g., each entry could be a pointer to another buffer). The computation of the expression can be independent of this algorithm. The aggregation function operates on another column (referred to as the "aggregation column") in the base database table. In this example, the aggregation column is the purchase_amount column.

The following table (Table D) is a logical representation of an association between (1) columns in a base table that lists purchases and (2) dictionary values for two of the columns. This purchases table may include other columns not depicted here. Also, while Table D only has seven rows, a real-world purchases table may comprise thousands or millions of rows, one for each purchase

TABLE D

| Store_ID | Key Value for Store_ID | Purchase Amount | Purchase-Date | Key Value for Purchase_Date | RowID |
|---|---|---|---|---|---|
| 123 | 0 | 400 | Jan. 1, 2000 | 0 | R1 |
| 83 | 3 | 232 | May 6, 2000 | 3 | R2 |
| 78 | 4 | 340 | Jul. 3, 2000 | 4 | R3 |
| 643 | 2 | 550 | May 6, 2000 | 3 | R4 |
| 78 | 4 | 330 | Jul. 3, 2000 | 4 | R5 |
| 83 | 3 | 50 | Mar. 10, 2000 | 2 | R6 |
| 78 | 4 | 140 | Feb. 17, 2000 | 1 | R7 |

Buffer for Storing Aggregated Data

In processing a top-K query that includes an aggregation function and a GROUP BY clause that indicates the partition-by column and the order-by column, the temporary buffer described herein may be used to store the order-by key values. Also, the adjacent buffer may be used to store row identifiers into the base database object.

In an embodiment, another buffer is generated for storing aggregated data according to the aggregation function. This buffer is referred to herein as the "aggregation buffer." For each order-by key value that is inserted into the temporary buffer, a slot in the aggregation buffer is identified and an aggregation column value from the corresponding row in the base database object is "applied" to the identified slot (in the aggregation buffer).

The aggregation buffer may be associated with a similar indexing scheme for identifying slots in the aggregation buffer in which to apply aggregation column values. "Applying" an aggregation column value may involve inserting the aggregation column value or performing the aggregation function with the aggregation column value as input. In an embodiment, the indexing scheme leverages both the partition-by key value and the order-by key value, both of which correspond to the aggregation column value. One example indexing scheme into the aggregation buffer is one that is identical to the indexing scheme used for the temporary buffer. Thus, the aggregation buffer may be identical in form as the temporary buffer. However, if slots in the temporary buffer move around or are removed, then corresponding slots in the aggregation buffer also move around or are removed. Moving slots around occurs in the implementation where order-by keys are stored in sorted order.

One example indexing scheme into the aggregation buffer is as follows: the input partition-by key value*the number of unique order-by key values+the input order-by key value. The result of this computation (referred to herein as a "grouping key") may be used as an index into the aggregation buffer, even if the dictionary of partition-by key values and the dictionary of order-by key values do not start with 0. Thus, the size of this aggregation buffer is the product of P and O (where P=number of unique partition-by key values and O=the number of unique order-by key values). However, such an aggregation buffer may have a significant number of unused entries and slots, indicating that there are a number of unused combinations of partition-by key values and order-by key values.

In a related embodiment, a dense aggregation buffer is generated that is smaller than an aggregation buffer whose size is the product of P and O. One way to generate a dense aggregation buffer is to initialize a structure to map grouping keys to 'dense grouping keys'. For example, this structure could be a hash table, an array, or a segmented array. Also, a count d of the number of assigned dense grouping keys is initialized to 0. For each row to process, obtain the grouping key, and then query this mapping structure to obtain the assigned dense grouping key for the grouping key. If no such dense grouping key is already assigned, then the mapping structure is updated to assign the current value of d as the dense grouping key, and then d is incremented by 1. When performing aggregation, this dense grouping key is used for indexing into the dense aggregation buffer rather than the grouping key. Thus, the dense aggregation buffer can be sized to the number of dense grouping keys, which is the number of actual unique groups.

Another example of a optimization is to not perform the aggregation for the rows belonging to the groups that will not be sent back (e.g., the groups that are filtered out because they are not in the top K). By constructing the temporary buffer before beginning any aggregation, the temporary buffer can be used to effectively identify which groups will need to be returned for the query, and only aggregate for rows that belong to those groups. For example, if a row has partition key value p and order key value s, that row only needs to be aggregated if, in the temporary buffer, the order key value s is found in one of the slots for the section indexed by partition key value p. Since this check would need to be performed for every row, this can be further optimized by constructing a bit vector indexed by grouping key that indicates whether the group for the corresponding grouping key is needed. Alternatively, when this optimization is used in conjunction with dense aggregation buffers, the mapping structure (mapping grouping keys to dense grouping keys) could instead just assign a special dense grouping key value indicating "group not needed" for the grouping keys representing the groups that won't be returned.

Depending on the type of aggregation function, once a slot in the aggregation buffer is identified, the aggregation column value in question (or "input aggregation column value") may be operated on in one of two ways: (a) inserting the input aggregation column value into the slot or (b) performing the aggregation function on the input aggregation column value and one or more other values in the identified slot. For example, for the summation function, the value in a slot of the aggregation buffer (which value may be 0 initially) is summed with the input aggregation column value. For the maximum function, the input aggregation column value is compared with the value in the identified slot and if the aggregation column value is greater than the value in the identified slot, then the input aggregation column value replaces the value in the identified slot. For the average function, the input aggregation column value is added to a list of aggregation column values (which list may be empty initially). It is only after the base database object has been scanned that the average function is applied to each set of aggregation column values in each slot of the aggregation buffer.

Multiple Dictionaries Per Column

In some implementations, a single column may be associated with multiple dictionaries. This may be the case if the column resides in different storage sections (e.g., due to its size) and a different dictionary is defined for each section.

In an embodiment where a single column is associated with multiple dictionaries, techniques described herein may be followed for each section and dictionary and then the top-K results for each section are decompressed (based on its corresponding dictionary) and then merged to obtain a final top-K result set. For example, if a salary column (an order-by column) has five dictionaries, then five temporary buffers are generated, one for each dictionary. The (temporary) top-K results associated with each dictionary is computed. Then the dictionary values in each of the (temporary) top-K results are mapped/translated back (or decompressed) to their native values using the dictionary mapping corresponding to the top-K results. Such a translation is relatively fast since only K*N translations need to be performed, where N is the number of sections/dictionaries. After each temporary top-K result set is mapped back to their native values, all the temporary top-K result sets are merged to generate a single top-K result set.

Push Down Architecture

Figure 2:
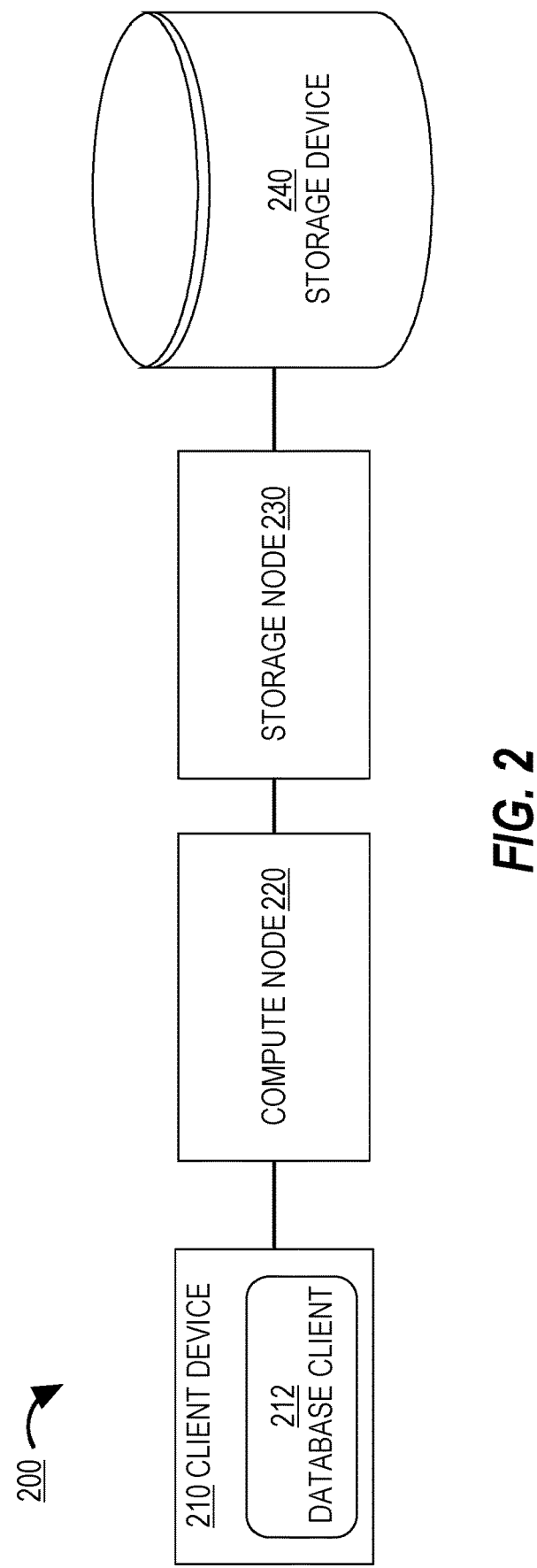
FIG. 2 is a block diagram that depicts an example database architecture for processing top-K queries, in an embodiment.

In an embodiment, leveraging dictionary values and one or more temporary buffers may be "pushed down" to computing devices that are closest to data storage. FIG. 2 is a block diagram that depicts an example database architecture 200 for processing top-K queries, in an embodiment.

Database architecture 200 includes at least four entities: a client device 210 (that hosts a database client 212), a compute node 220 (that hosts a database server 222), a storage node 230, and a storage device 240. Although only a single instance of each entity is depicted, database architecture 200 may comprises multiple client devices, multiple compute nodes, multiple storage nodes, and/or multiple storage devices. Additionally or alternatively, compute node 220 may host multiple database servers that execute concurrently and can process database statements in parallel with each other.

Client device 210 is communicatively coupled to compute node 220. Client device 210 and compute node 220 may be located in the same network or subnet or may be connected via a wide area network (WAN) or the Internet. Database client 212 transmits database statements to compute node 220. Examples of database statements include data definition language (DDL) statements (such as create table), data manipulation language (DML) statements that update data in a database (e.g., delete, modify, and insert rows), and queries that request data from data storage 240. Database statements may conform to one of multiple languages, an example of which is Structured Query Language (SQL) and its variants.

A database statement may be composed based on input from a user. For example, a user provides input (e.g., through a user interface on client device 210) to database client 212, which translates the input into a database statement that compute node 220 recognizes and can process.

Compute node 220 comprises a database server 222 that receives and processes database statements or translated versions thereof. While processing database statements, database server 222 sends data requests to storage node 220. A data request may identify one or more database objects (identified in the corresponding database statement) to retrieve, such as a table, an index, an index-organized table (IOT). A data request may identify one or more predicates from the corresponding database statement, such as a column value or range of column values, names of columns to return, etc.

Storage node 230 retrieves data blocks from storage device 240 in response to data requests from compute node 220. As described in more detail herein, storage node 230 may process retrieved data blocks before transmitting those data blocks (or modified versions thereof) to compute node 220. Examples of storage device 240 include a hard disk drive (HDD) and a solid state drive (SSD), such as Flash.

Storage device 240 stores data in data blocks, each of which is a contiguous area of persistent (or non-volatile) memory. Each data block has a unique data block address (DBA) through which the data block may be referenced. A data block may have a fixed size, such as 4 KB. The format of a data block may vary depending on the type of data stored in the data block. For example, a data block may store rows of a table, entries of an index (e.g., a B-tree index), or rows of an index-organized table (IOT).

Thus, either compute node 220 or storage node 230 may generate and populate a temporary buffer. However, in an embodiment, compute node 220 transmits elements of a database statement to storage node 230, which generates and populates the temporary buffer. Based on the transmission, storage node 230 determines which column is a partition-by column and which column is an order-by column. Storage node 230 may perform this determination (a) directly on the database statement that compute node 220 received, (b)

based on a portion of the database statement that compute node 220 transmitted to storage node 230, or (c) based on column identification data that compute node 220 transmits to storage node 230. In other words, regarding (c) compute node 220 may make the determination of which column is which and send that determination to storage node 230.

An advantage of this approach (i.e., where storage node 230 generates and populates the temporary buffer) is that the closer to data storage 240 that such operations are performed, the less data that is passed between storage node 230 and compute node 220, which reduces network traffic and speeds up query processing.

Example Process

Figure 3:
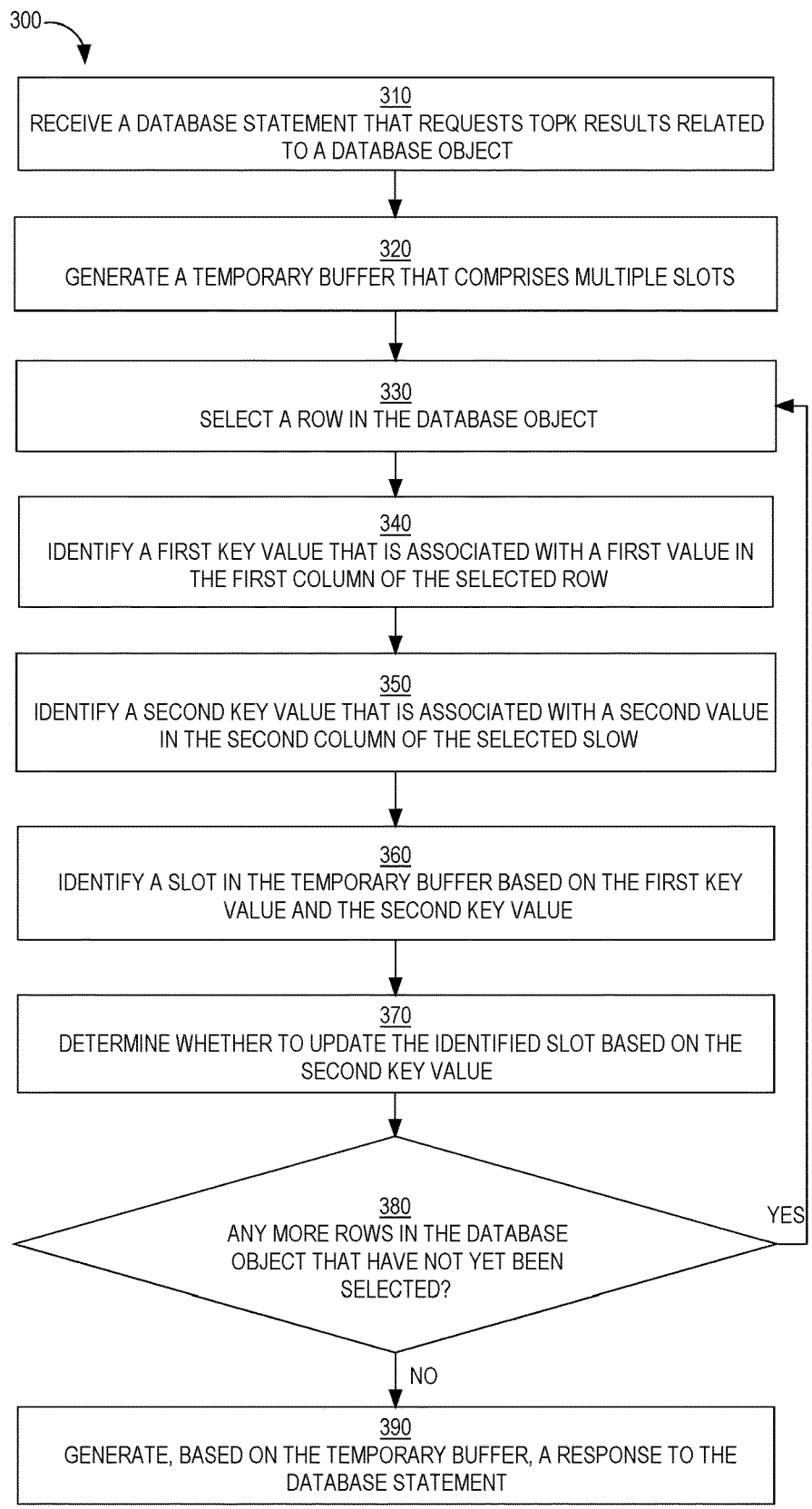
FIG. 3 is a flow diagram that depicts an example process for processing top-K queries, in an embodiment.

FIG. 3 is a flow diagram that depicts an example process 300 for processing top-K queries, in an embodiment. Process 300 may be performed by elements or components of database system 100 or of database architecture 200.

At block 310, a database statement is received that requests top K results related to a database object. The database statement indicates a first column, of the database object, by which to partition a result set that is generating by processing the database statement. The database statement also indicates a second column, of the database object, by which to order the result set. Block 310 may involve transmitting the top K query (or a portion thereof) from a compute node to a storage node that has direct access to data storage where the database object is stored.

At block 320, a temporary buffer is generated that comprises multiple entries. Block 320 may involve generating an array whose size is the product of (1) the number of unique key values in the dictionary for the partition-by column and (2) K.

At block 330, a row in the database object is selected. In the first iteration of block 330 for this database statement, block 330 may involve selecting the first row in the database object while in the second iteration of block 330 for this database statement, block 330 may involve selecting the second row in the database object. The row that is selected has not been selected before when processing the database statement.

At block 340, a first key value that is associated with a first value in the first column of the identified row is identified. The first key value is a dictionary value in a dictionary of key values for the first column. The first key value may be in the same identified row, but in a column that is adjacent to the first column.

At block 350, a second key value that is associated with a second value in the second column of the identified row is identified. The second key value is a dictionary value in a dictionary of key values for the second column. The second key value may be in the same identified row, but in a column that is adjacent to the second column.

At block 360, a slot in the temporary buffer is identified based on the first key value and the second key value. Block 360 may involve identifying an entry in the temporary buffer based on the first key value and then identifying the slot in the temporary buffer based on the second key value.

At block 370, it is determined whether the identified slot in the temporary buffer is updated based on the second key value. Block 370 may involve storing the second key value in the identified slot. Additionally, block 370 may involve deleting and/or ordering one or more other entries in the temporary buffer that correspond to the same first key value. Alternatively, block 370 may involve ignoring the second key value altogether.

At block 380, it is determined whether there are any more row in the database object that have not yet been considered. If so, then process 300 returns to block 330 may another row is selected. If not, then process 300 proceeds to block 390.

At block 390, a response to the database statement is generated based on the temporary buffer. Block 390 may involve transmitting the response to a requesting entity, whether that requesting entity is (a) a database client from which the database statement originated or (b) a software process higher up in a software stack that is used to execute top-K queries. Block 390 may involve first converting the key values in the temporary buffer to their corresponding values in the order-by column. Additionally or alternatively, block 390 may involve returning, to the requesting entity, row identifiers identifying rows in the database object.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
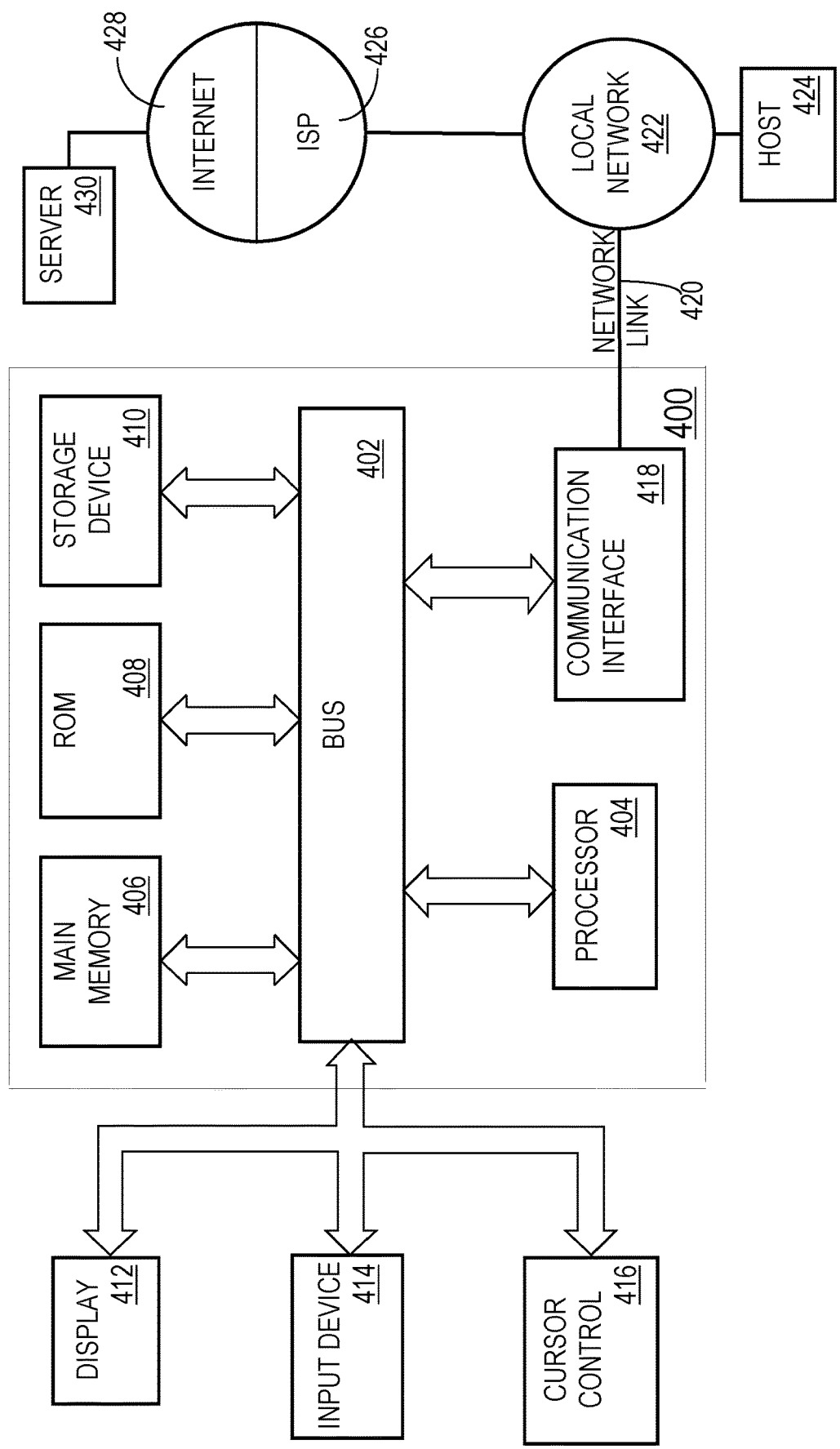
FIG. 4 is a block diagram that illustrates an example computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving a database statement that requests top K results related to a database object and that indicates (1) a first column, of the database object, by which to partition a result set of processing the database statement and (2) a second column, of the database object, by which to order the result set;

generating a temporary buffer that comprises a plurality of slots;

for each row of multiple rows in the database object:
  identifying a first key value that is associated with a first value in the first column of said each row;
  identifying a second key value that is associated with a second value in the second column of said each row;
  identifying a slot in the temporary buffer based on the first key value and the second key value;
  determining whether to update the slot in the temporary buffer based on the second key value and any key values already in the slot;
based on the temporary buffer, responding to the database statement;
wherein the method is performed by one or more computing devices.

2. The method of claim 1, further comprising:
determining a first number of unique key values associated with the first column;
determining a second number of unique keys associated with the second column;
wherein generating the temporary buffer comprises generating the temporary buffer based on the first number of unique key values and the second number of unique key values.

3. The method of claim 1, wherein identifying the slot in the temporary buffer comprises:
based on the first key value, identifying, in the temporary buffer, a particular slot or a range of slots;
wherein identifying the slot comprises, if the range of slots is identified based on the first key value, searching the range of slots based on the second key value, wherein the slot is within the range of slots;
wherein identifying the slot comprises, if the particular slot is identified based on the first key value, searching from the particular slot based on the second key value to identify the slot.

4. The method of claim 3, wherein identifying the slot based on the second key value comprises:
determining whether the particular slot or a certain slot in the range of slots satisfies one or more criteria;
in response to determining that the particular slot or the certain slot in the range of slots does not satisfy the one or more criteria, identifying, in the temporary buffer, a second slot that is within the range of slots or that is different than the particular slot;
determining whether the second slot satisfies the one or more criteria.

5. The method of claim 1, wherein the temporary buffer is a first temporary buffer, the method further comprising:
storing a second temporary buffer that corresponds to the first temporary buffer and that comprises a second plurality of slots;
for said each row of the multiple rows:
  determining an index value of a position of the slot, determined for said each row, in the first temporary buffer;
  updating, in the second temporary buffer, a particular slot whose position in the second temporary buffer is also at the index value, wherein updating the particular slot comprises including, in the particular slot, a position identifier of the second value in the database object.

6. The method of claim 1, wherein the temporary buffer is a first temporary buffer, the method further comprising:

determining that the database statement also includes an aggregation function that indicates a third column of the database object;
generating a second temporary buffer that is different than the first temporary buffer;
wherein an index into the second temporary buffer is a key value associated with the first column, a key value associated with the second column, and a cardinality of key values in the second column;
wherein each slot of one or more slots in the second temporary buffer stores results of the aggregation function applied to multiple values from the third column of the database object.

7. The method of claim 6, wherein the database statement also includes a group by clause that indicates a plurality of columns, the method further comprising:
determining whether the first column and the second column are included in the plurality of columns;
wherein generating the second temporary buffer is only performed in response to determining that the first column and the second column are included in the plurality of columns.

8. The method of claim 6, further comprising:
for said each rows of the multiple row of the database object:
  generating a grouping key by summing (3) the product of the first key value and the cardinality of key values of the second column with (4) the second key value;
  based on the grouping key, identifying a particular slot, in the second temporary buffer;
  inserting, into the particular slot, a particular value from the third column of said each row or performing the aggregation function with respect to the particular value and an existing value in the particular slot.

9. The method of claim 1, wherein data for the second column resides in a plurality of sections, wherein each section of the plurality of sections is associated with a different dictionary of a plurality of dictionaries, wherein the temporary buffer is a first temporary buffer, wherein the multiple rows are stored in a first section of the plurality of sections, wherein the method further comprising:
generating a second temporary buffer that is different than the first temporary buffer and that comprises a second plurality of slots;
for each row of second multiple rows in a second section, of the database object, that is different than the first section:
  identifying a third key value that associated with a third value in the first column of said each row;
  identifying a fourth key value that associated with a fourth value in the second column of said each row;
  identifying a particular slot in the second temporary buffer based on the third key value and the fourth key value;
  determining whether to update the particular slot in the second temporary buffer based on the fourth key value and any key values already in the particular slot;
wherein responding to the database statement is also performed based on the second temporary buffer.

10. The method of claim 9, further comprising:
merging (1) first top K results that are associated with the first temporary buffer with (2) second top K results that are associated with the second temporary buffer to generate merged top K results;

wherein responding to the database statement is based on the merged top K results.

11. One or more non-transitory storage media storing instructions which, when executed by one or more computing devices, cause:
  receiving a database statement that requests top K results related to a database object and that indicates (1) a first column, of the database object, by which to partition a result set of processing the database statement and (2) a second column, of the database object, by which to order the result set;
  generating a temporary buffer that comprises a plurality of slots;
  for each row of multiple rows in the database object:
    identifying a first key value that is associated with a first value in the first column of said each row;
    identifying a second key value that is associated with a second value in the second column of said each row;
    identifying a slot in the temporary buffer based on the first key value and the second key value;
    determining whether to update the slot in the temporary buffer based on the second key value and any key values already in the slot;
  based on the temporary buffer, responding to the database statement.

12. The one or more storage media of claim 11, wherein the instructions, when executed by the one or more computing devices, further cause:
  determining a first number of unique key values associated with the first column;
  determining a second number of unique keys associated with the second column;
  wherein generating the temporary buffer comprises generating the temporary buffer based on the first number of unique key values and the second number of unique key values.

13. The one or more storage media of claim 11, wherein identifying the slot in the temporary buffer comprises:
  based on the first key value, identifying, in the temporary buffer, a particular slot or a range of slots;
  wherein identifying the slot comprises, if the range of slots is identified based on the first key value, searching the range of slots based on the second key value, wherein the slot is within the range of slots;
  wherein identifying the slot comprises, if the particular slot is identified based on the first key value, searching from the particular slot based on the second key value to identify the slot.

14. The one or more storage media of claim 13, wherein identifying the slot based on the second key value comprises:
  determining whether the particular slot or a certain slot in the range of slots satisfies one or more criteria;
  in response to determining that the particular slot or the certain slot in the range of slots does not satisfy the one or more criteria, identifying, in the temporary buffer, a second slot that is within the range of slots or that is different than the particular slot;
  determining whether the second slot satisfies the one or more criteria.

15. The one or more storage media of claim 11, wherein the temporary buffer is a first temporary buffer, wherein the instructions, when executed by the one or more computing devices, further cause:
  storing a second temporary buffer that corresponds to the first temporary buffer and that comprises a second plurality of slots;
  for said each row of the multiple rows:
    determining an index value of a position of the slot, determined for said each row, in the first temporary buffer;
    updating, in the second temporary buffer, a particular slot whose position in the second temporary buffer is also at the index value, wherein updating the particular slot comprises including, in the particular slot, a position identifier of the second value in the database object.

16. The one or more storage media of claim 11, wherein the temporary buffer is a first temporary buffer, wherein the instructions, when executed by the one or more computing devices, further cause:
  determining that the database statement also includes an aggregation function that indicates a third column of the database object;
  generating a second temporary buffer that is different than the first temporary buffer;
  wherein an index into the second temporary buffer is a key value associated with the first column, a key value associated with the second column, and a cardinality of key values in the second column;
  wherein each slot of one or more slots in the second temporary buffer stores results of the aggregation function applied to multiple values from the third column of the database object.

17. The one or more storage media of claim 16, wherein the database statement also includes a group by clause that indicates a plurality of columns, wherein the instructions, when executed by the one or more computing devices, further cause:
  determining whether the first column and the second column are included in the plurality of columns;
  wherein generating the second temporary buffer is only performed in response to determining that the first column and the second column are included in the plurality of columns.

18. The one or more storage media of claim 16, wherein the instructions, when executed by the one or more computing devices, further cause:
  for said each row of the multiple row of the database object:
    generating a grouping key by summing (3) the product of the first key value and the cardinality of key values of the second column with (4) the second key value;
    based on the grouping key, identifying a particular slot, in the second temporary buffer;
    inserting, into the particular slot, a particular value from the third column of said each row or performing the aggregation function with respect to the particular value and an existing value in the particular slot.

19. The one or more storage media of claim 11, wherein data for the second column resides in a plurality of sections, wherein each section of the plurality of sections is associated with a different dictionary of a plurality of dictionaries, wherein the temporary buffer is a first temporary buffer, wherein the multiple rows are stored in a first section of the plurality of sections, wherein the instructions, when executed by the one or more computing devices, further cause:
  generating a second temporary buffer that is different than the first temporary buffer and that comprises a second plurality of slots;

for each row of second multiple rows in a second section, of the database object, that is different than the first section:
identifying a third key value that associated with a third value in the first column of said each row;
identifying a fourth key value that associated with a fourth value in the second column of said each row;
identifying a particular slot in the second temporary buffer based on the third key value and the fourth key value;
determining whether to update the particular slot in the second temporary buffer based on the fourth key value and any key values already in the particular slot;
wherein responding to the database statement is also performed based on the second temporary buffer.

20. The one or more storage media of claim 19, wherein the instructions, when executed by the one or more computing devices, further cause:
merging (1) first top K results that are associated with the first temporary buffer with (2) second top K results that are associated with the second temporary buffer to generate merged top K results;
wherein responding to the database statement is based on the merged top K results.

* * * * *

UNITED STATES PATENT AND TRADEMARK OFFICE
CERTIFICATE OF CORRECTION

| | | |
|---|---|---|
| PATENT NO. | : 11,966,399 B1 | |
| APPLICATION NO. | : 17/966749 | |
| DATED | : April 23, 2024 | |
| INVENTOR(S) | : Lui et al. | |

It is certified that error appears in the above-identified patent and that said Letters Patent is hereby corrected as shown below:

On the Title Page

Column 1, under item (72) Inventors, Line 2, delete "L" and insert -- L. --, therefor.

In the Specification

In Column 11, Line 48, delete "purchase" and insert -- purchase. --, therefor.

In the Claims

In Column 22, Line 25, in Claim 8, delete "rows" and insert -- row --, therefor.

In Column 22, Line 25, in Claim 8, delete "row" and insert -- rows --, therefor.

In Column 24, Line 44, in Claim 18, delete "row" and insert -- rows --, therefor.

Signed and Sealed this
Sixth Day of August, 2024

Katherine Kelly Vidal
*Director of the United States Patent and Trademark Office*